US012651771B2

(12) United States Patent
Kim et al.

(10) Patent No.: US 12,651,771 B2
(45) Date of Patent: Jun. 9, 2026

(54) ELECTROLYTIC SOLUTION FOR LITHIUM SECONDARY BATTERIES AND LITHIUM SECONDARY BATTERY INCLUDING THE SAME

(71) Applicants: Hyundai Motor Company, Seoul (KR); Kia Corporation, Seoul (KR); The Industry & Academic Cooperation in Chungnam National University (IAC), Daejeon (KR)

(72) Inventors: Ko Eun Kim, Cheongju (KR); Seung Min Oh, Incheon (KR); Yoon Sung Lee, Suwon (KR); Sung Ho Ban, Hwaseong (KR); Jun Ki Rhee, Suwon (KR); Hui Beom Nam, Hwaseong (KR); Seung Wan Song, Sejong (KR); Min Geun Oh, Daejeon (KR); Se Hyun Kwak, Daejeon (KR)

(73) Assignees: Hyundai Motor Company, Seoul (KR); Kia Corporation, Seoul (KR); The Industry & Academic Cooperation in Chungnam National University (IAC), Daejeon (KR)

( * ) Notice: Subject to any disclaimer, the term of this patent is extended or adjusted under 35 U.S.C. 154(b) by 749 days.

(21) Appl. No.: 17/974,811

(22) Filed: Oct. 27, 2022

(65) Prior Publication Data

US 2023/0291011 A1 Sep. 14, 2023

(30) Foreign Application Priority Data

Mar. 11, 2022 (KR) ........................ 10-2022-0030792

(51) Int. Cl.
*H01M 10/0567* (2010.01)
*H01M 4/134* (2010.01)
(Continued)

(52) U.S. Cl.
CPC ....... *H01M 10/0567* (2013.01); *H01M 4/134* (2013.01); *H01M 4/386* (2013.01);
(Continued)

(58) Field of Classification Search
CPC ......... H01M 10/0567; H01M 10/0568; H01M 10/0569; H01M 2300/0025; H01M 4/525;
(Continued)

(56) References Cited

U.S. PATENT DOCUMENTS

2006/0228625 A1 10/2006 Kawashima
2019/0173123 A1 * 6/2019 Shimanuki ........ H01M 10/0567
(Continued)

FOREIGN PATENT DOCUMENTS

JP 2003-086244 A 3/2003
JP 2007-123242 A 5/2007
(Continued)

OTHER PUBLICATIONS

Sewon Park, et al. "Replacing conventional battery electrolyte additives with dioxolone derivatives for high energy density lithium ion batteries", Nature Communications 12:838, Jan. 7, 2021.

*Primary Examiner* — Laura Weiner
(74) *Attorney, Agent, or Firm* — Fox Rothschild LLP

(57) ABSTRACT

Disclosed are an electrolytic solution for lithium secondary batteries capable of improving lifespan characteristics of a lithium secondary battery under a high voltage condition and a lithium secondary battery including the same. The electrolytic solution may includes a lithium salt, a solvent, and a functional additive. In particular, the functional additive
(Continued)

includes a high-voltage additive including a first high-voltage additive, e.g., hexafluoroglutaric anhydride, and a second high-voltage additive, e.g., fluoroethylene carbonate.

11 Claims, 9 Drawing Sheets

(51) Int. Cl.

| | |
|---|---|
| ***H01M 4/38*** | (2006.01) |
| ***H01M 4/525*** | (2010.01) |
| ***H01M 4/587*** | (2010.01) |
| ***H01M 10/0525*** | (2010.01) |
| ***H01M 10/0568*** | (2010.01) |
| ***H01M 10/0569*** | (2010.01) |
| *H01M 4/36* | (2006.01) |

(52) U.S. Cl.
CPC ........... *H01M 4/525* (2013.01); *H01M 4/587* (2013.01); *H01M 10/0525* (2013.01); *H01M 10/0568* (2013.01); *H01M 10/0569* (2013.01); *H01M 4/364* (2013.01); *H01M 2300/0025* (2013.01)

(58) Field of Classification Search
CPC ...... H01M 4/134; H01M 4/386; H01M 4/587; H01M 4/133; H01M 10/0525; H01M 4/364
See application file for complete search history.

(56) References Cited

U.S. PATENT DOCUMENTS

| | | | | |
|---|---|---|---|---|
| 2019/0181441 | A1* | 6/2019 | Ji | ...................... H01M 10/0567 |
| 2020/0388882 | A1 | 12/2020 | Ji et al. | |

FOREIGN PATENT DOCUMENTS

| | | | |
|---|---|---|---|
| KR | 10-2016-0080995 | A | 7/2016 |
| KR | 10-2016-0118330 | A | 10/2016 |
| KR | 101816949 | B1 | 1/2018 |
| KR | 10-2020-0047199 | A | 5/2020 |
| WO | WO 2018/052077 | * | 3/2018 |

* cited by examiner

ELECTROLYTIC SOLUTION FOR LITHIUM SECONDARY BATTERIES AND LITHIUM SECONDARY BATTERY INCLUDING THE SAME

CROSS-REFERENCE TO RELATED APPLICATION

This application claims the benefit of Korean Patent Application No. 10-2022-0030792, filed on Mar. 11, 2022, with the Korean Intellectual Property Office, the disclosure of which is herein incorporated by reference in its entirety.

TECHNICAL FIELD

The present invention relates to an electrolytic solution for lithium secondary batteries and a lithium secondary battery including the same. The electrolytic solution can improve lifespan characteristics of a lithium secondary battery under a high voltage condition.

BACKGROUND

A lithium secondary battery is an energy storage device including a positive electrode configured to provide lithium during charging, a negative electrode configured to receive lithium during charging, an electrolyte serving as a lithium ion transfer medium, and a separator configured to separate the positive electrode and the negative electrode from each other. The lithium secondary battery generates and stores electric energy through a change in chemical potential when lithium ions are intercalated/deintercalated at the positive electrode and the negative electrode.

The lithium secondary battery has been mainly used in portable electronic devices. In recent years, however, the lithium secondary battery has also been used as an energy storage means of an electric vehicle (EV) and a hybrid electric vehicle (HEV) as the electric vehicle and the hybrid electric vehicle are commercialized.

Meanwhile, research to increase the energy density of the lithium secondary battery in order to increase the range of the electric vehicle has been conducted. The energy density of the lithium secondary battery may be increased by increasing the capacity of the positive electrode.

The capacity of the positive electrode may be increased by using a Ni-rich method, which is a method of increasing the content of Ni in a Ni—Co—Mn oxide forming a positive electrode active material, or by increasing positive electrode charging voltage to a high voltage.

However, the Ni-rich Ni—Co—Mn oxide has an unstable crystalline structure while exhibiting high interfacial reactivity, whereby degradation during cycles is accelerated and thus it is difficult to secure long-term performance of the lithium secondary battery.

In other words, the positive electrode made of the Ni-rich Ni—Co—Mn oxide has problems in that oxidative decomposition of the electrolytic solution, interfacial reaction between the positive electrode and the electrolytic solution, metal elution, gas generation, phase change into an inactive cubic state, increase in metal deposition at the negative electrode, increase in interfacial resistance of the battery, accelerated degradation, charging and discharging performance degradation, and instability at high temperatures are caused due to high content of Ni and high reactivity of $Ni^{4+}$ formed in the electrolytic solution during charging, whereby safety and lifespan of the battery are reduced In addition, research and development of a silicon-graphite negative electrode active material including silicon have been continuously conducted to increase the capacity of the negative electrode in conjunction with an increase in capacity of the positive electrode. However, there is still a problem in that the lifespan of the battery is reduced due to a change in volume of silicon and interfacial instability.

For example, for a silicon-graphite negative electrode, lattice volume is increased to 300% or greater during charging, volume is decreased during discharging, Si surface inactivation chemical species are formed in large quantities due to interfacial reaction with $LiPF_6$ salt, and safety and lifespan of the battery are reduced due to low coverage of SEI, low mechanical strength, increase in interfacial resistance, performance degradation, gas generation, and consumption of the electrolytic solution.

The matters disclosed in this section are merely for enhancement of understanding of the general background of the invention and should not be taken as an acknowledgment or any form of suggestion that the matters form the related art already known to a person skilled in the art.

SUMMARY

In preferred aspects, provided are an electrolytic solution for lithium secondary batteries capable of simultaneously improving SEI stability of a silicon-graphite negative electrode and SEI stability of a positive electrode under a high voltage condition, thereby securing stability in charging and discharging performance of a high-capacity positive electrode, and a lithium secondary battery including the same.

Objects of the present invention are not limited to the aforementioned object, and other unmentioned objects will be clearly understood by those skilled in the art based on the following description.

In an aspect, provided is an electrolytic solution for lithium secondary batteries, which may include a lithium salt, a solvent, and a functional additive. The functional additive may include a high-voltage additive including a first high-voltage additive and a second high-voltage additive.

A term "high-voltage additive" as used herein refers to a component for an electrolyte solution component of lithium secondary battery, and a particular component contributing to improving SEI stability of, e.g., a silicon-graphite negative electrode and/or a positive electrode, under a high voltage condition, e.g., greater than about 2.0 V, greater than about 2.5 V, greater than about 3.0V, greater than about 3.5 V, greater than about 4.0 V, or in a range of about 2.0 V to 4.5V.

The first and second high-voltage additives may be independently functioning and, may be the same or different type. For example, if the first and second high-voltage additives are different, the first high-voltage additive may have a property of improving oxidative stability of the electrolytic solution and forming a protective layer on the surface of each of a positive electrode and a negative electrode, while the second high-voltage additive may have a property of forming a protective layer on the surface of the negative electrode, independently or additionally to the first high-voltage additive.

In particular, the first high-voltage additive may include hexafluoroglutaric anhydride, having a structure of Formula 1 and the second high-voltage additive may include fluoroethylene

[Formula 1]

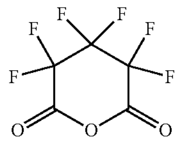

carbonate having a structure of Formula 2.

[Formula 2]

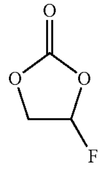

The electrolytic solution may include the high-voltage additive in an amount of about 0.6 to 4.0 wt % based on the weight of the electrolytic solution.

The electrolytic solution may include the first high-voltage additive in an amount of about 0.1 to 1.5 wt % based on the weight of the electrolytic solution, and the electrolytic solution may include the second high-voltage additive in an amount of about 0.5 to 2.5 wt % based on the weight of the electrolytic solution.

The electrolytic solution may include the high-voltage additive in an amount of about 1.1 to 3.0 wt % based on the weight of the electrolytic solution.

The electrolytic solution may include the first high-voltage additive in an amount of about 0.1 to 1.0 wt % based on the weight of the electrolytic solution, and the second high-voltage additive in an amount of about 1.0 to 2.0 wt % based on the weight of the electrolytic solution.

The functional additive may further include vinylene carbonate (VC) as a negative electrode film additive.

The electrolytic solution may include the negative electrode film additive in an amount of about 0.5 to 3.0 wt % based on the weight of the electrolytic solution.

The electrolytic solution may include the functional additive in an amount of about 5 wt % or less based on the weight of the electrolytic solution.

The electrolytic solution may include the first high-voltage additive in an amount of about 0.1 to 1.0 wt % based on the weight of the electrolytic solution, the second high-voltage additive in an amount of about 1.0 to 2.0 wt % based on the weight of the electrolytic solution, and the negative electrode film additive in an amount of about 1.5 to 2.5 wt % based on the weight of the electrolytic solution.

The lithium salt may include one or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$ (LiFSI), and $(CF_3SO_2)_2NLi$.

The solvent may include one or more selected from the group consisting of a carbonate-based solvent, an ester-based solvent, an ether-based solvent, and a ketone-based solvent.

In an aspect, provided is a lithium secondary battery including the electrolytic solution. The lithium secondary battery may further include a positive electrode including a positive electrode active material including Ni, Co, and Mn, a negative electrode including carbon (C)-based negative electrode active material, silicon (Si)-based negative electrode active materials, or combinations thereof, and a separator interposed between the positive electrode and the negative electrode.

The positive electrode may include Ni in an amount of about 80 wt % or greater based on the total weight of the positive electrode.

Other aspects of the invention are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
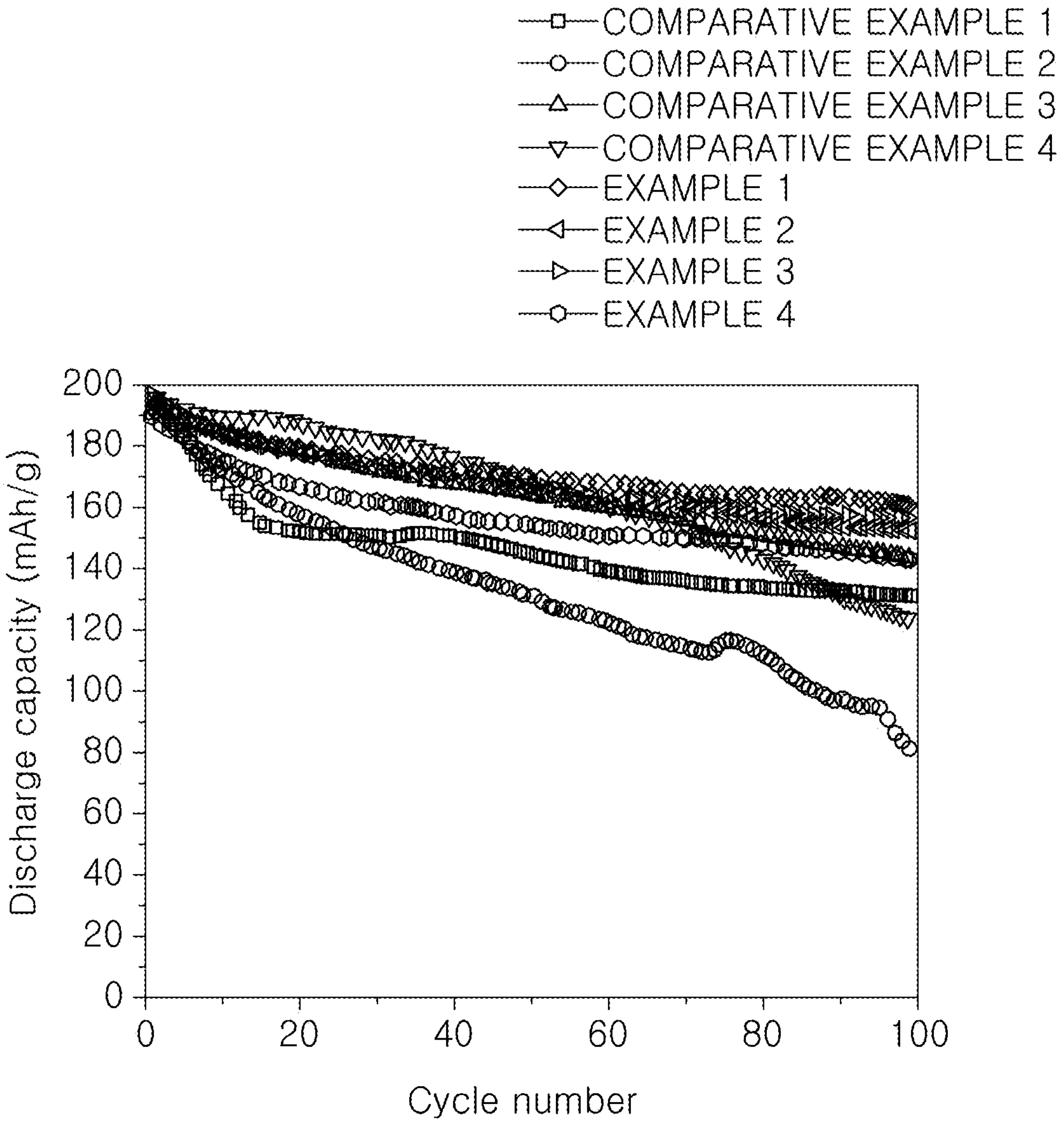
FIG. 1 is a graph showing results of charging and discharging experiments of examples according to an exemplary embodiment of the present invention and comparative examples.

Hereinafter, exemplary embodiments of the present invention will be described in detail with reference to the accompanying drawings. However, the present invention is not limited to the embodiments disclosed below and may be implemented in various different forms, and the embodiments herein are provided to make the disclosure of the present invention complete and to fully convey the scope of the invention to those skilled in the art. Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to encompass the plural meaning as well, unless the context clearly indicates otherwise.

It will be further understood that terms such as "comprise" or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range. In addition, for example, the range of "10% to 30%" encompasses all integers that include numbers such as 10%, 11%, 12%, and 13%, as well as 30%, and any sub-ranges, such as 10% to 15%, 12% to 18%, or 20% to 30%, as well as any numbers, such as 10.5%, 15.5%, and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An electrolytic solution for lithium secondary batteries according to various exemplary embodiments of the present invention, which is a material that forms an electrolyte applied to a lithium secondary battery, includes a lithium salt, a solvent, and a functional additive.

The lithium salt may include one or more selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$ (LiFSI), and $(CF_3SO_2)_2NLi$.

The lithium salt may be contained in the electrolytic solution so as to have a total molar concentration of about 0.1 to 3.0.

Any one or a mixture of two or more selected from the group of a carbonate-based solvent, an ester-based solvent, an ether-based solvent, and a ketone-based solvent may be used as the solvent.

Dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), or vinylene carbonate (VC) may be used as the carbonate-based solvent. γ-butyrolactone (GBL), n-methyl acetate, n-ethyl acetate, or n-propyl acetate may be used as the ester-based solvent. Dibutyl ether may be used as the ether-based solvent. However, the present invention is not limited thereto.

In addition, the solvent may further include an aromatic hydrocarbon-based organic solvent. Specific examples of the aromatic hydrocarbon-based organic solvent may include benzene, fluorobenzene, bromobenzene, chlorobenzene, cyclohexylbenzene, isopropylbenzene, n-butylbenzene, octylbenzene, toluene, xylene, and mesitylene, which may be used alone or in combination.

In one aspect, the electrolytic solution may suitably include a first high-voltage additive, e.g., hexafluoroglutaric anhydride having a structure of Formula 1, and a second high-voltage additive, e.g., fluoroethylene carbonate having a structure of Formula 2, may be used as the functional additive added to the electrolytic solution according to the embodiment of the present invention.

[Formula 1]

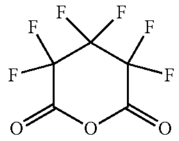

-continued

[Formula 2]

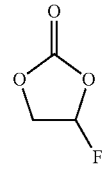

The first high-voltage additive, e.g., hexafluoroglutaric anhydride, may improve oxidative stability of the electrolytic solution and to form a protective layer on the surface of each of a positive electrode and a negative electrode, and may be suitably added in an amount of about 0.1 to 1.5 wt % based on the weight of the electrolytic solution. Preferably, the first high-voltage additive may be suitably added in an amount of about 0.4 to 1.0 wt % based on the weight of the electrolytic solution.

The second high-voltage additive, e.g., fluoroethylene carbonate, may form a protective layer on the surface of the negative electrode, and may be suitably added in an amount of about 0.5 to 2.5 wt % based on the weight of the electrolytic solution. Preferably, the second high-voltage additive may be suitably added in an amount of about 1.0 to 2.0 wt % based on the weight of the electrolytic solution.

Consequently, the total addition amount of the high-voltage additive may be about 0.6 to 4.0 wt % based on the weight of the electrolytic solution. Preferably, the total addition amount of the high-voltage additive may be about 1.1 to 3.0 wt % based on the weight of the electrolytic solution.

When the addition amount of the high-voltage additive is less than about 0.6 wt %, or particularly, less than about 1.1 wt %, the effect of improving oxidative stability of the electrolytic solution may be incomplete and formation of a sufficient surface protective layer is difficult, whereby expected effects are incomplete. When the addition amount of the high-voltage additive is greater than about 4.0 wt %, or particularly about 3.0 wt %, the resistance of a cell is increased due to formation of an excessive surface protective layer, whereby lifespan of the cell is reduced.

Meanwhile, a negative electrode film additive serving to form a film on the negative electrode may be further added as the functional additive. For example, Vinylene Carbonate (VC) may be suitably used as the negative electrode film additive.

Preferably, the negative electrode film additive may be added in an amount of about 0.5 to 3.0 wt % based on the weight of the electrolytic solution. Particularly, the addition amount of the negative electrode film additive may be about 1.5 to 2.5 wt %.

When the addition amount of the negative electrode film additive is less than about 0.5 wt %, the long-term lifespan characteristics of the cell may be deteriorated. When the addition amount of the negative electrode film additive is greater than about 3.0 wt %, the resistance of the cell may be increased due to formation of an excessive surface protective layer, whereby battery output is reduced.

In particular, the total addition amount of the functional additive constituted by the first high-voltage additive, the second high-voltage additive, and the negative electrode film additive may be about 5 wt % or less based on the weight of the electrolytic solution.

Meanwhile, a lithium secondary battery according to an embodiment of the present invention includes a positive electrode, a negative electrode, and a separator in addition to the electrolytic solution.

The positive electrode includes an NCM-based positive electrode active material including Ni, Co, and Mn. Particularly, the positive electrode active material included in the positive electrode to be constituted by only an NCM-based positive electrode active material having about 80 wt % or greater of Ni.

The negative electrode includes at least one selected from among carbon (C)-based and silicon (Si)-based negative electrode active materials.

At least one selected from the group consisting of artificial graphite, natural graphite, graphitized carbon fiber, graphitized mesocarbon microbeads, fullerene, and amorphous carbon may be used as the carbon (C)-based negative electrode active material.

The silicon (Si)-based negative electrode active material includes silicon oxide, silicon particles, and silicon alloy particles.

Meanwhile, each of the positive electrode and the negative electrode is manufactured by mixing an active material, a conductive agent, a binder, and a solvent with each other to manufacture an electrode slurry, directly coating a current collector with the electrode slurry, and drying the electrode slurry. At this time, aluminum (Al) may be used as the current collector. However, the present invention is not limited thereto. Such an electrode manufacturing method is well known in the art to which the present invention pertains, and therefore a detailed description thereof will be omitted.

The binder serves to properly attach active material particles to each other or to properly attach the active material particles to the current collector. For example, polyvinyl alcohol, carboxymethyl cellulose, hydroxypropyl methylcellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene butadiene rubber, acrylated styrene butadiene rubber, an epoxy resin, or nylon may be used as the binder. However, the present invention is not limited thereto.

In addition, the conductive agent is used to provide conductivity to the electrode. The conductive agent is not particularly restricted as long as the conductive agent exhibits high electrical conductivity while the conductive agent does not induce any chemical change in a battery to which the conductive agent is applied. For example, natural graphite, artificial graphite, carbon black, acetylene black, Ketjen black, carbon fiber, metallic powder, such as copper powder, nickel powder, aluminum powder, or silver powder, or metallic fiber may be used as the conductive agent. In addition, conductive materials, such as polyphenylene derivatives, may be used alone or in combination.

The separator prevents short circuit between the positive electrode and the negative electrode and provides a movement path for lithium ions. A polyolefin-based polymer film, such as polypropylene, polyethylene, polyethylene/polypropylene, polyethylene/polypropylene/polyethylene, or polypropylene/polyethylene/polypropylene, a multilayer film thereof, a microporous film, woven fabric, or non-woven fabric, which are known, may be used as the separator. In addition, a porous polyolefin film coated with a resin having excellent stability may be used.

EXAMPLE

Hereinafter, the present invention will be described through examples of the present invention and comparative examples.

Experiment 1: Experiment on Charging and Discharging Characteristics (Full Cell) at High Temperature (45° C.) Depending on Kind and Addition Amount of Functional Additive In order to determine charging and discharging characteristics depending on the kind and addition amount of a functional additive added to an electrolytic solution, the initial capacity at a high temperature (45° C.) and the capacity retention rate after 100 cycles were measured while the kind and addition amount of the functional additive were changed, as shown in Table 1 below, and the results are shown in Table 1 and FIG. 1. Also, in order to determine a positive electrode surface protection effect depending on addition of the functional additive added to the electrolytic solution, the surface of a positive electrode after 100 cycles was observed, and result photographs of the surfaces of a negative electrode particle and a positive electrode particle are shown in FIGS. 2 to 4.

Figure 2:
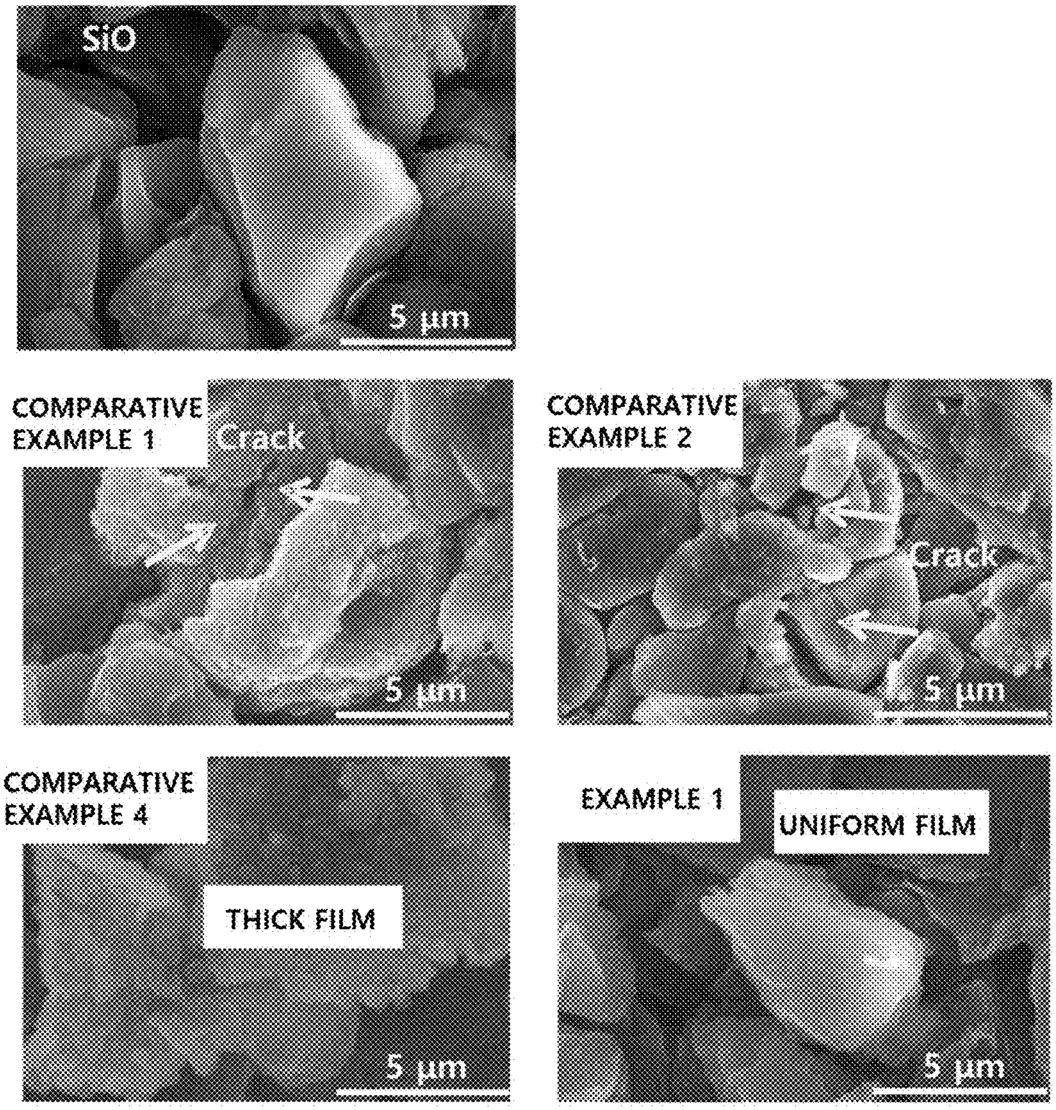
FIG. 2 is a result photograph of the surface of a silicon (SiO) particle, among negative electrode particles, after charging and discharging experiments of an example according to an exemplary embodiment of the present invention and comparative examples.
Figure 3:
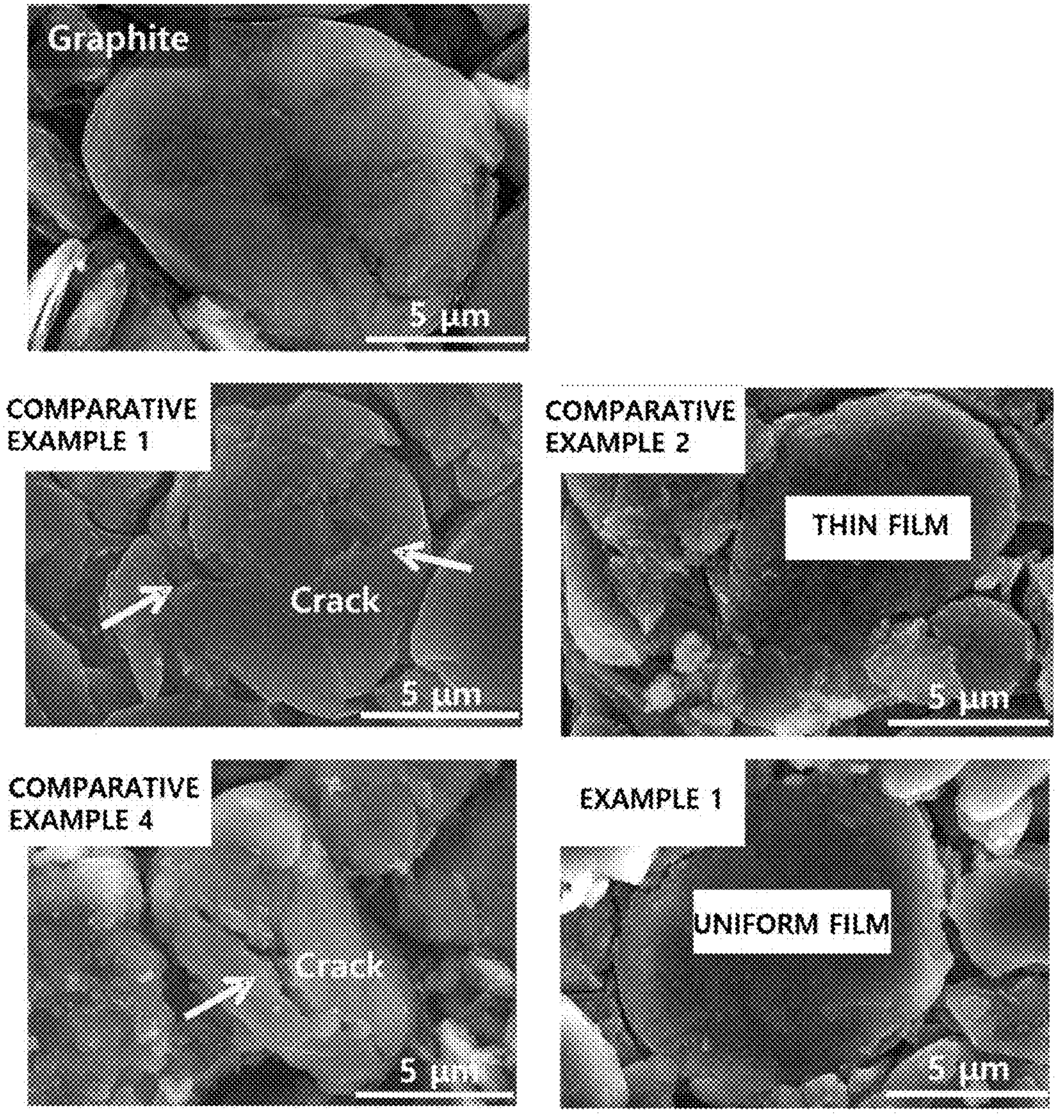
FIG. 3 is a result photograph of the surface of a graphite particle, among negative electrode particles, after charging and discharging experiments of an example according to an exemplary embodiment of the present invention and comparative examples.
Figure 4:
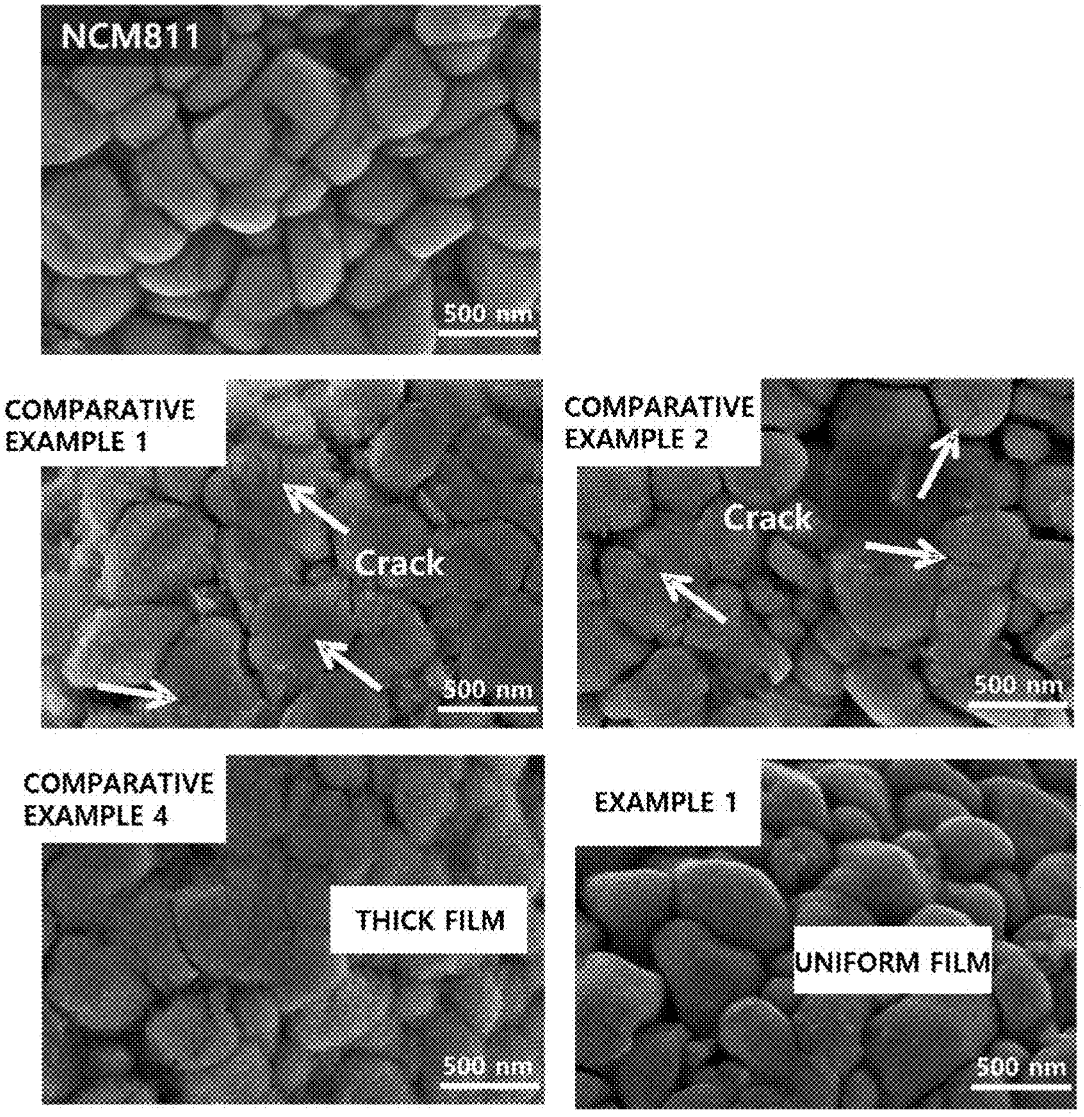
FIG. 4 is a result photograph of the surface of a positive electrode particle after charging and discharging experiments of an example according to an exemplary embodiment of the present invention and comparative examples.
Figure 5:
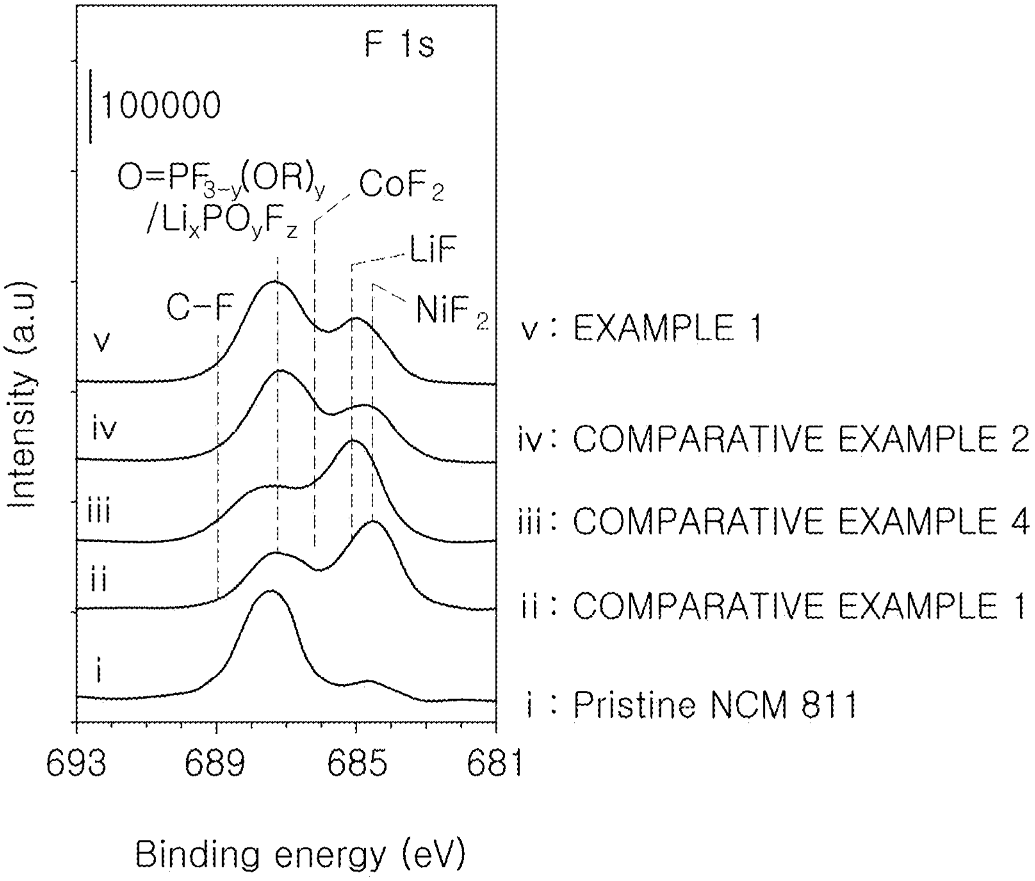
FIG. 5 is an analysis graph of a positive electrode with respect to F is after charging and discharging experiments of an example according to an exemplary embodiment of the present invention and comparative examples.
Figure 6:
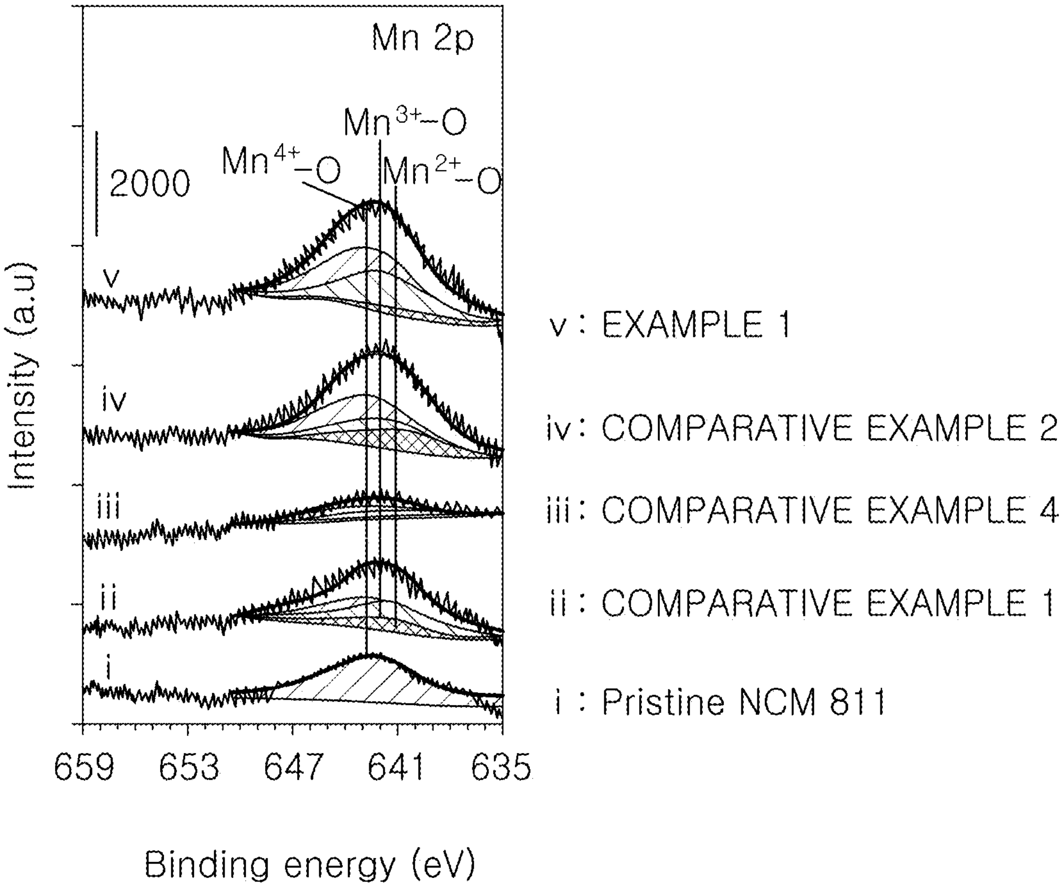
FIG. 6 is an analysis graph of a positive electrode with respect to Mn 2p after charging and discharging experiments of an example according to the present invention and comparative examples.
Figure 7:
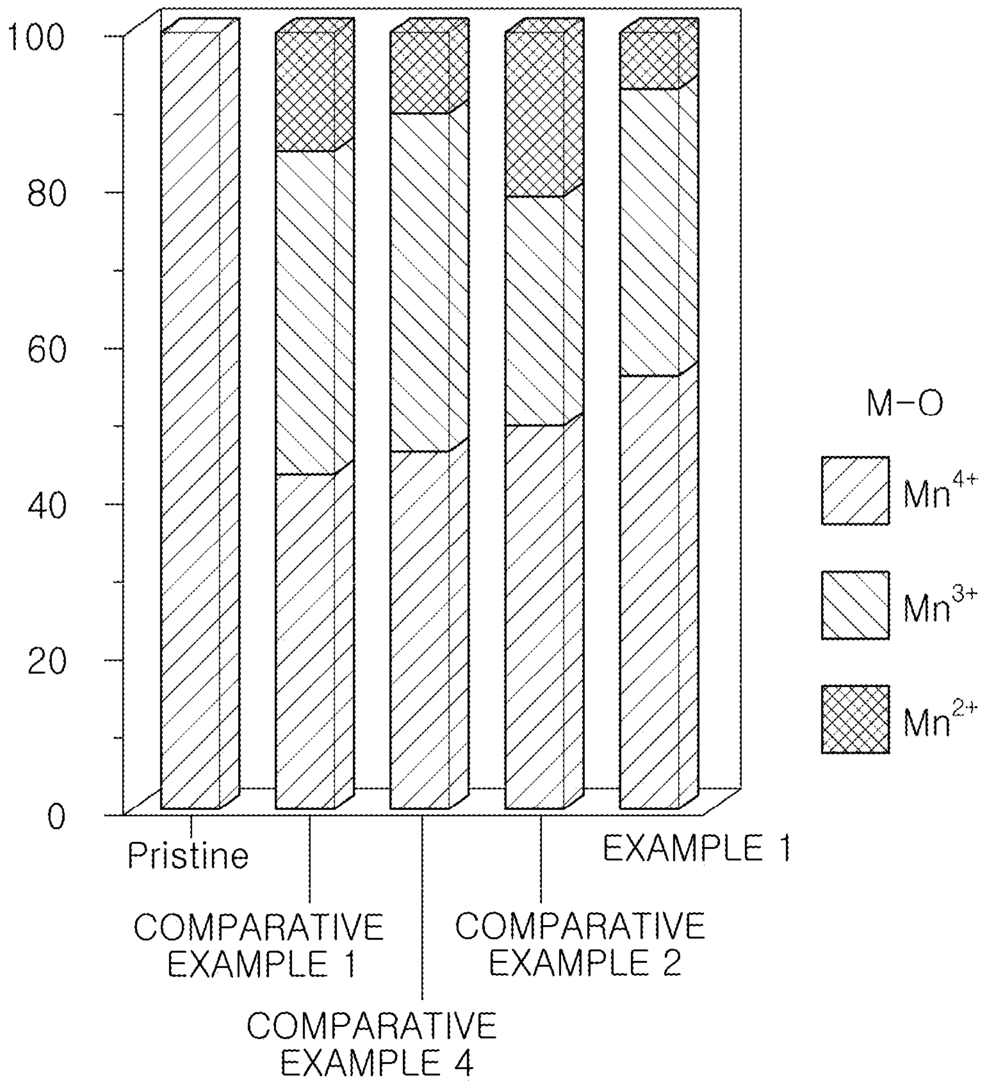
FIG. 7 is an analysis graph of a positive electrode with respect to M-O after charging and discharging experiments of an example according to an exemplary embodiment of the present invention and comparative examples.
Figure 8:
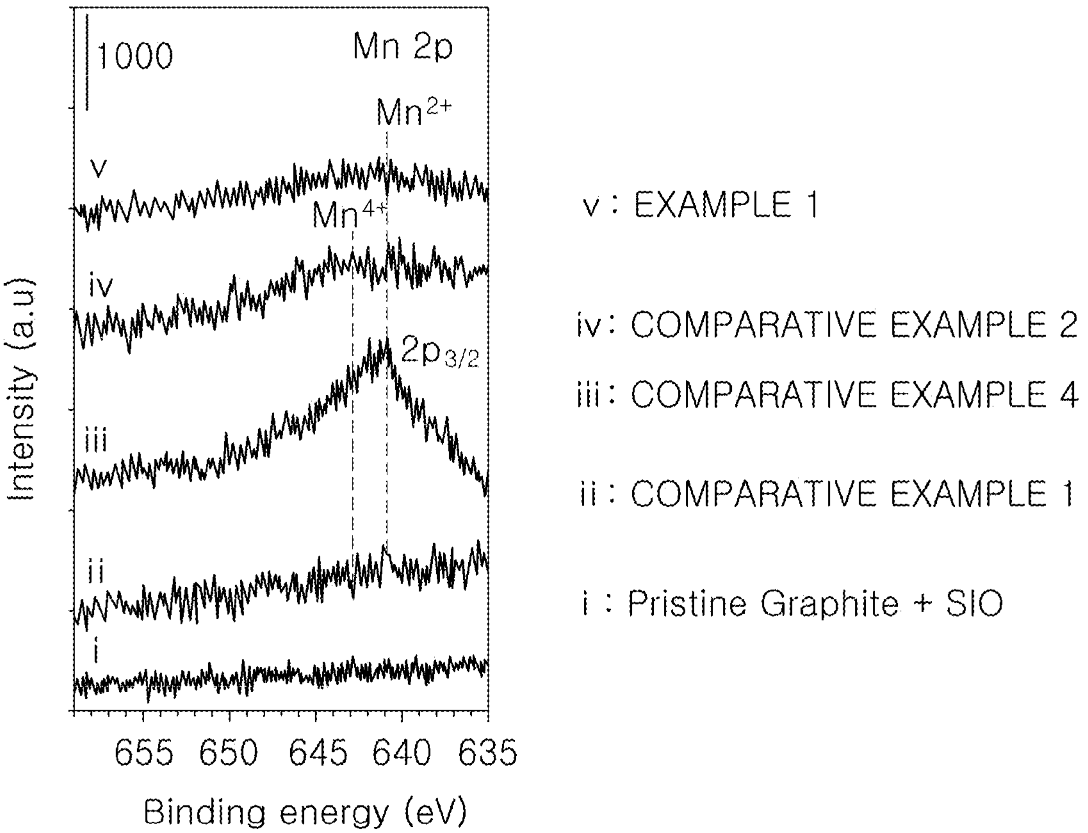
FIG. 8 is an analysis graph of a negative electrode with respect to Mn 2p after charging and discharging experiments of an example according to an exemplary embodiment of the present invention and comparative examples.

A result photograph of the surface of a silicon (SiO) particle and a result photograph of the surface of a graphite particle are shown in FIGS. 2 and 3, respectively.

At this time, cycles were performed at 2.5 to 4.35V, 1 C and 45° C., 1M of $LiPF_6$ was used as a lithium salt necessary to manufacture the electrolytic solution, and a mixture of ethylene carbonate (EC), ethylmethyl carbonate (EMC), and diethyl carbonate (DEC) mixed at a volume ratio of 25:45:30 was used as a solvent.

NCM811 was used as a positive electrode, and graphite+SiO were used as a negative electrode.

TABLE 1

| Cl. | Additive: VC | Additive: First high-voltage additive | Additive: Second high-voltage additive | Initial capacity @1 C 1st cycle (mAh/g) | Capacity retention rate @1 C 100 cycles (%) |
|---|---|---|---|---|---|
| Comparative Example 1 | 2.0 | — | — | 191.4 | 68.2 |
| Comparative Example 2 | 2.0 | 0.25 | — | 195.5 | 40.7 |
| Comparative Example 3 | 2.0 | — | 1.0 | 197.6 | 72.7 |
| Comparative Example 4 | 2.0 | — | 2.0 | 197.2 | 62.3 |
| Example 1 | 2.0 | 0.25 | 2.0 | 198.3 | 81.3 |
| Example 2 | 2.0 | 0.1 | 2.0 | 197.1 | 77.3 |
| Example 3 | 2.0 | 0.5 | 2.0 | 198.5 | 78.9 |
| Example 4 | 2.0 | 1.0 | 2.0 | 190.4 | 75 |

First, as shown in Table 1 and FIG. 1, in Examples 1 to 4, in which the kind and addition amount of the high-voltage additive according to the present invention were changed while a conventional general functional additive of VC was used, the capacity retention rate was improved, compared to Comparative Example 1, in which only VC was used.

Particularly, in Comparative Examples 2 and 4, in which one of a first high-voltage additive and a second high-voltage additive was selected and added, the capacity retention rate was rather lower than in Comparative Example 1.

Also, in Comparative Example 3, in which the second high-voltage additive was selected and added as the high-voltage additive but the addition amount of the second high-voltage additive was small, the capacity retention rate was improved, compared to Comparative Example 1, but was lower than in Examples 1 to 4.

Consequently, even when the first high-voltage additive, which is one of the first high-voltage additive and the second high-voltage additive, is added as the functional additive, a capacity retention rate improvement effect is achieved, but it is preferable for both the first high-voltage additive and the second high-voltage additive to be added within a specified range of the addition amount.

FIG. 2 is a result photograph of the surface of a silicon (SiO) particle, among negative electrode particles, after experiment on charging and discharging characteristics (full cell) at a high temperature (45° C.). As shown in FIG. 2, cracks were formed in the surface of the silicon particle in Comparative Examples 1 and 2 and that a thick film was formed on the surface of the silicon particle in Comparative Example 4.

In contrast, a uniform film was formed on the surface of the silicon particle in Example 1.

FIG. 3 is a result photograph of the surface of a graphite particle, among negative electrode particles, after experiment on charging and discharging characteristics (full cell) at a high temperature (45° C.). It can be seen from FIG. 3 that cracks were formed in the surface of the graphite particle in Comparative Examples 1 and 4 and that a thin film was formed on the surface of the graphite particle in Comparative Example 2.

In contrast, a uniform film was formed on the surface of the graphite particle in Example 1.

FIG. 4 is a result photograph of the surface of a positive electrode particle after experiment on charging and discharging characteristics (full cell) at a high temperature (45° C.). It can be seen from FIG. 4 that cracks were formed in the surface of the positive electrode particle in Comparative Examples 1 and 2 and that a thick film was formed on the surface of the positive electrode particle in Comparative Example 4, like the surface of the silicon particle of the negative electrode.

In contrast, a uniform film was formed on the surface of the positive electrode particle in Example 1.

Experiment 2: Measurement of Thickness of Negative Electrode Before and After Experiment on Charging and Discharging Characteristics (Full Cell) at High Temperature (45° C.) Depending on Kind and Addition Amount of Functional Additive Experiment on charging and discharging characteristics (full cell) at a high temperature (45° C.) were performed under the same conditions as in Experiment 1, the thickness of the negative electrode was measured before and after the experiments, and the results are shown in Table 2.

TABLE 2

| Classification | Thickness of negative electrode before cycle (μm) | Thickness of negative electrode after cycle (μm) | Negative electrode thickness change rate (%) |
|---|---|---|---|
| Comparative Example 1 | 72 | 97 | Δ34.7 |
| Comparative Example 2 | 74 | 97 | Δ31.1 |

TABLE 2-continued

| Classification | Thickness of negative electrode before cycle (μm) | Thickness of negative electrode after cycle (μm) | Negative electrode thickness change rate (%) |
|---|---|---|---|
| Comparative Example 3 | 73 | 86 | Δ17.8 |
| Comparative Example 4 | 73 | 109 | Δ49.3 |
| Example 1 | 72 | 90 | Δ25.0 |
| Example 2 | 73 | 95 | Δ30.1 |
| Example 3 | 73 | 90 | Δ23.3 |
| Example 4 | 73 | 89 | Δ21.9 |

As shown in Table 2, in Examples 1 to 4, in which the kind and addition amount of the high-voltage additive according to the present invention were changed while a conventional general functional additive of VC was used, the negative electrode thickness change rate was less than in Comparative Example 1, in which only VC was used.

Also, in Comparative Examples 2 and 3, in which one of the first high-voltage additive and the second high-voltage additive was selected and added as the high-voltage additive, the negative electrode thickness change rate was less than in Comparative Example 1.

However, in Comparative Example 4, in which the second high-voltage additive was selected and added as the high-voltage additive but the addition amount of the second high-voltage additive was large, the negative electrode thickness change rate was rather greater than in Comparative Example 1.

Consequently, even in terms of the negative electrode thickness change rate, it is preferable for both the first high-voltage additive and the second high-voltage additive, as the high-voltage additive added as the functional additive, to be added within a specified range of the addition amount.

Experiment 3: Experiment on Charging and Discharging Characteristics (Full Cell) at High Temperature (45° C.) Depending on Kind and Addition Amount of Functional Additive In order to determine charging and discharging characteristics depending on the kind and addition amount of a functional additive added to a reference electrolytic solution including changed components, compared to Experiment 1, the initial capacity at a high temperature (45° C.) and the capacity retention rate after 100 cycles were measured while the kind and addition amount of the functional additive were changed, as shown in Table 3 below, and the results are shown in Table 3 and FIG. 9.

At this time, cycles were performed at 2.5 to 4.35V, 1 C and 45° C., 0.5 LiFSI+0.5M $LiPF_6$ were used as a lithium salt necessary to manufacture the electrolytic solution, and a mixture of ethylene carbonate (EC), ethylmethyl carbonate (EMC), and diethyl carbonate (DEC) mixed at a volume ratio of 25:45:30 was used as a solvent.

NCM811 was used as a positive electrode, and graphite+SiO were used as a negative electrode.

TABLE 3

| Cl. | Additive | | | Initial capacity | Capacity retention |
|---|---|---|---|---|---|
| | VC | First high-voltage additive | Second high-voltage additive | @1 C 1st cycle (Ah/g) | rate @1 C 100 cycles (%) |
| Comparative Example 5 | 2.0 | — | — | 1.24 | 68.8 |
| Comparative Example 6 | 2.0 | — | 2.0 | 1.24 | 70.2 |
| Example 5 | 2.0 | 0.25 | 2.0 | 1.24 | 75.5 |

Figure 9:
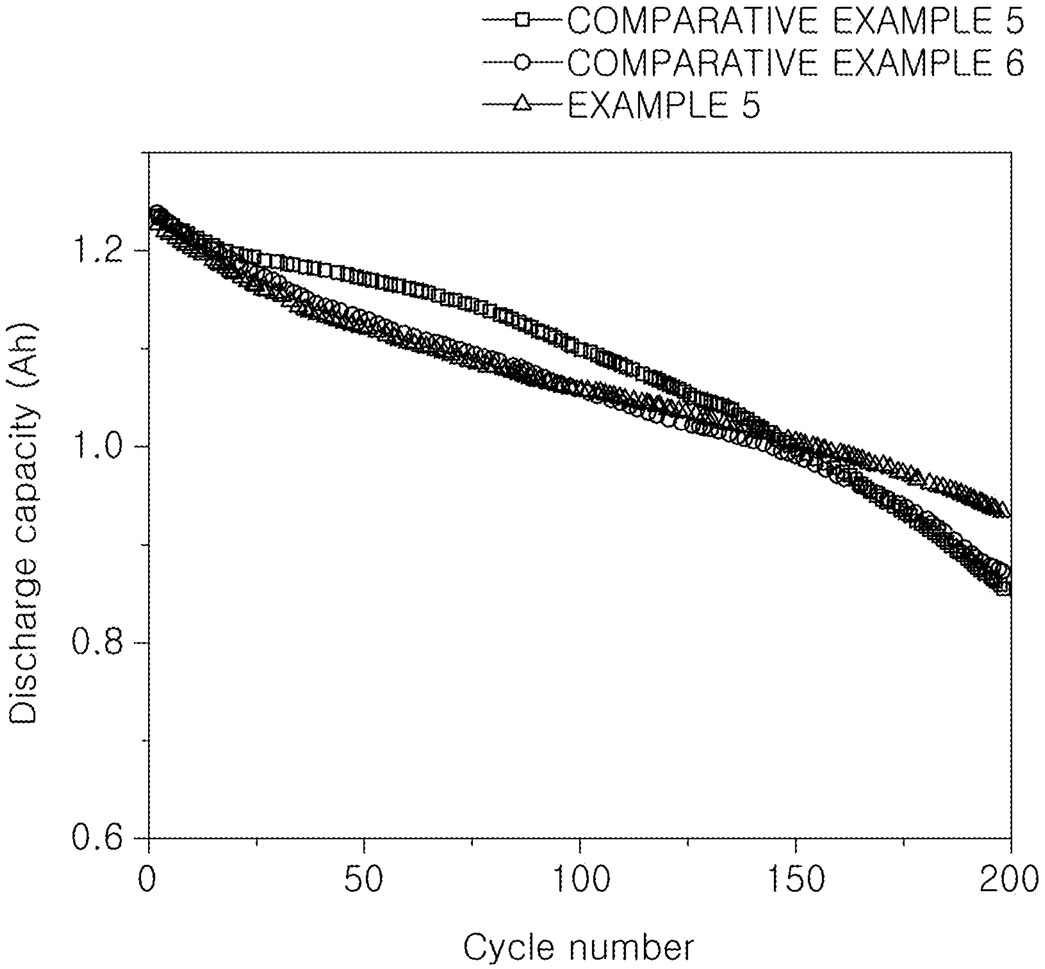
FIG. 9 is a graph showing results of charging and discharging experiments of an example according to an exemplary embodiment of the present invention and comparative examples.

As shown in Table 3 and FIG. 9 that, in Example 5, in which the kind and addition amount of the high-voltage additive according to the present invention were applied while a conventional general functional additive of VC was used, the capacity retention rate was improved, compared to Comparative Example 5, in which only VC was used, and Comparative Example 6, in which the second high-voltage additive was selected and added as the high-voltage additive.

According to various exemplary embodiments of the present invention, an electrolytic solution including a high-voltage additive may be preferably used, whereby oxidative stability of a 4.4 V electrolytic solution is secured. Consequently, side reactivity at a high voltage can be inhibited, whereby the long-term lifespan characteristics of a lithium secondary battery can be improved.

In addition, degradation of the surface of a positive electrode is inhibited and stability of a negative electrode film can be improved by the electrolytic solution, whereby the lifespan of the lithium secondary battery is increased.

Furthermore, lifespan stability of the battery at high temperature and high voltage can be secured, whereby marketability of the battery is improved.

Although the present invention has been described with reference to the accompanying drawings and the above exemplary embodiment, the present invention is not defined thereby but by the appended claims. Accordingly, it will be apparent to those skilled in the art that various modifications and variations can be made in the present invention without departing from the technical idea of the appended claims.

What is claimed is:

1. An electrolytic solution for lithium secondary batteries, the electrolytic solution comprising a lithium salt, a solvent and a functional additive, wherein the functional additive comprises a high-voltage additive comprising a first high-voltage additive and a second high-voltage additive, wherein the first high-voltage additive comprises a compound having a structure of Formula 1 and the second high-voltage additive comprises a compound having a structure of Formula 2, wherein the electrolytic solution comprises the high-voltage additive in a total amount of about 0.6 to 4.0 wt % based on a weight of the electrolytic solution, wherein: the electrolytic solution comprises the first high-voltage additive in the high-voltage additive in an amount of about 0.1 to 1.5 wt % based on the weight of the electrolytic solution, and the electrolytic solution comprises the second high-voltage additive in an amount of about 0.5 to 2.5 wt % based on the weight of the electrolytic solution.

[Formula 1]

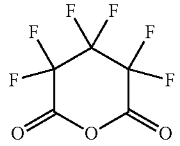

[Formula 2]

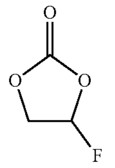

2. The electrolytic solution according to claim 1, wherein the electrolytic solution comprises the high-voltage additive in a total amount of about 1.1 to 3.0 wt % based on the weight of the electrolytic solution.

3. The electrolytic solution according to claim 2, wherein: the electrolytic solution comprises the first high-voltage additive in an amount of about 0.1 to 1.0 wt % based on the weight of the electrolytic solution, and the electrolytic solution comprises the second high-voltage additive in an amount of about 1.0 to 2.0 wt % based on the weight of the electrolytic solution.

4. The electrolytic solution according to claim 1, wherein the functional additive further comprises vinylene carbonate (VC) as a negative electrode film additive, wherein the electrolytic solution comprises the negative electrode film additive in an amount of about 0.5 to 3.0 wt % based on a weight of the electrolytic solution.

5. The electrolytic solution according to claim 4, wherein a total addition amount of the functional additive is 5 wt % or less based on the weight of the electrolytic solution.

6. The electrolytic solution according to claim 5, wherein the electrolytic solution comprises:

the first high-voltage additive in an amount of about 0.1 to 1.0 wt % based on the weight of the electrolytic solution, the second high-voltage additive in an amount of about 1.0 to 2.0 wt % based on the weight of the electrolytic solution, and the negative electrode film additive in an amount of about 1.5 to 2.5 wt % based on the weight of the electrolytic solution.

7. The electrolytic solution according to claim 1, wherein the lithium salt comprises one or more selected from a group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LIN(SO_2C_2F_5)_2$, $Li(CF_3SO_2)_2N$, $LiC_4F_9SO_3$, $LiB(C_6H_5)_4$, $LiB(C_2O_4)_2$, $LiPO_2F_2$, $Li(SO_2F)_2N$ (LiFSI), and $(CF_3SO_2)_2NLi$.

8. The electrolytic solution according to claim 1, wherein the solvent is one or more selected from a group consisting of a carbonate-based solvent, an ester-based solvent, an ether-based solvent, and a ketone-based solvent.

9. A lithium secondary battery comprising a positive electrode; a negative electrode and the electrolytic solution according to claim 1.

10. The lithium secondary battery according to claim 9, wherein the positive electrode comprises a positive electrode active material comprising Ni, Co, and Mn;

the negative electrode comprises carbon (C)-based negative electrode active materials, silicon (Si)-based negative electrode active materials, or combinations thereof; and further comprising a separator interposed between the positive electrode and the negative electrode.

11. The lithium secondary battery according to claim 10, wherein the positive electrode comprises Ni in an amount of about 80 wt % or greater based on the weight of the positive electrode.

* * * * *